UNITED STATES PATENT OFFICE.

AUGUST LEOPOLD LASKA AND ERNST JULIUS RATH, OF OFFENBACH-ON-THE-MAIN, GERMANY, ASSIGNORS TO THE CORPORATION OF CHEMISCHE FABRIK GRIESHEIM-ELEKTRON, OF FRANKFORT-ON-THE-MAIN, GERMANY.

VAT DYESTUFF.

1,079,568.     Specification of Letters Patent.     Patented Nov. 25, 1913.

No Drawing.     Application filed June 12, 1913. Serial No. 773,185.

*To all whom it may concern:*

Be it known that we, AUGUST LEOPOLD LASKA, doctor of philosophy, and ERNST JULIUS RATH, doctor of philosophy, both chemists, citizens of the German Empire, and residents of Offenbach-on-the-Main, in the Grand Duchy of Hesse, Germany, with post-office addresses Wilhelmsplatz 18 and Kaiserstrasse 115, respectively, have invented new and useful Improvements in Vat Dyestuffs, of which the following is a specification.

Our invention relates to the manufacture and production of very powerful vat dyestuffs of the anthraquinone series, which are produced by reaction of glyoxylic acid on ortho-diamino-anthraquinones, it being advantageous to use 1 molecular proportion of the glyoxylic acid and 2 molecular proportions of the diamino-anthraquinone. The dyestuffs, thus obtained, exhibit deep black shades and differ thereby strictly from the products described in U. S. Patents Nos. 938,565, 1,022,781 and 1,023,248 and in German Patent No. 238,981, which are either colorless without any characteristics of dyestuffs or yield only light shades.

The new dyestuffs do not contain an imidazole ring, but the two diamino-anthraquinone radicals are most probably so combined that each of the two C-atoms of the glyoxylic acid becomes connected with two N-atoms of two diamino-anthraquinone radicals.

The compound obtainable from 1.2-diamino-anthraquinone, has probably the following constitution or a tautomeric or an isomeric form thereof:

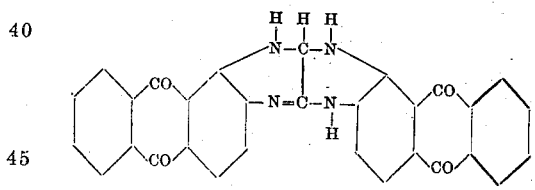

In order to illustrate the new process more fully the following examples are given, the parts being by weight:

Example 1: 24 parts of 1.2-diamino-anthraquinone are heated in 200 parts of acetic acid to boiling, and 93 parts of a solution containing 4% of glyoxylic acid are slowly added. After boiling for some hours the dyestuff, thus obtained is filtered while hot and dried; it is then freed from a small quantity of impurities by boiling it with nitrobenzene. It forms when dry a bluish black powder, which is insoluble in nearly all organic solvents, but can be crystallized from much boiling quinolin. The solution of the dyestuff in concentrated sulfuric acid is brownish red and its color is not changed by addition either of boric acid or of formaldehyde, the solution in fuming sulfuric acid containing 60% $SO_3$, is violet. The dyestuff yields with an alkaline solution of hydrosulfite a brownish red vat, which dyes cotton fast bluish black shades.

Example 2: A mixture of 12 parts of 1.2-diamino-anthraquinone with 200 parts of alcohol, 47 parts of a solution containing 4% of glyoxylic acid and 5 parts of sulfuric acid of 66° Bé. is boiled for 4 hours in a reflux-apparatus. The dyestuff, thus obtained, is filtered and dried. It is identical with the dyestuff, described in Example 1. The course of the reaction is similar when other solvents or diluents are used for example when using ethyl acetate or concentrated formic acid.

Example 3: 48 parts of 2.3-diamino-anthraquinone are heated with 500 parts of acetic acid and 185 parts of a solution containing 4% of glyoxylic acid, for 5 hours to boiling. The dyestuff, thus obtained, is treated in the manner described in Example 1. The compound forms a black powder and yields with an alkaline solution of hydrosulfite a reddish brown vat, which dyes cotton pure black shades.

Example 4: 25 parts of 1.2.3-triamino-anthraquinone are heated with 300 parts of acetic acid and 92 parts of a solution containing 4% of glyoxylic acid, for 5 hours to boiling. The dyestuff, thus obtained, is filtered and dried. It is very similar to the dyestuff obtained by the process of example 3, and yields also pure black shades on cotton.

Now what we claim and desire to secure by Letters Patent is the following:

1. The process of making vat dyestuffs of the anthraquinone series consisting in acting with glyoxylic acid upon ortho-diamino-anthraquinones.

2. As new articles the vat dyestuffs of the anthraquinone series, obtained by acting with glyoxylic acid upon ortho-diamino-anthraquinones, having probably the following formula:

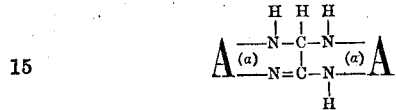

where A is an anthraquinone nucleus, which dyestuffs form when dry black to bluish black powders and yield with alkaline hydrosulfite solution a reddish brown to brownish red vat, which dyes cotton fast black to bluish black shades.

3. The process of making a vat dyestuff of the anthraquinone series, consisting in acting with glyoxylic acid upon 1.2-diamino-anthraquinone.

4. As a new article a vat dyestuff, obtained by acting with glyoxylic acid upon 1.2-diamino-anthraquinone, having probably the following formula:

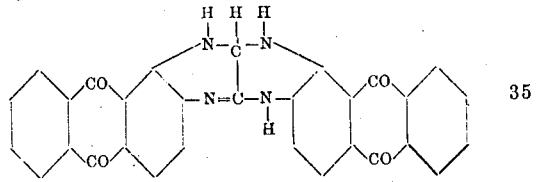

which dyestuff dissolves in concentrated sulfuric acid to a brownish red solution, not changed by addition either of boric acid or of formic aldehyde, in fuming sulfuric acid, containing 60% $SO_3$, to a violet solution, forming dry a bluish black powder, yielding with alkaline hydrosulfite solution a brownish red vat, which dyes cotton fast bluish black shades.

In testimony that we claim the foregoing as our invention, we have signed our names in presence of two witnesses, this 31st day of May 1913.

AUGUST LEOPOLD LASKA.
ERNST JULIUS RATH.

Witnesses:
PETER LAUTENSCHLÄGER,
RUDOLF KIMPEL.